Oct. 21, 1947.  W. E. BRADLEY ET AL  2,429,200
METHOD AND MEANS FOR MEASURING HIGH-FREQUENCY ENERGY
Filed Dec. 24, 1943
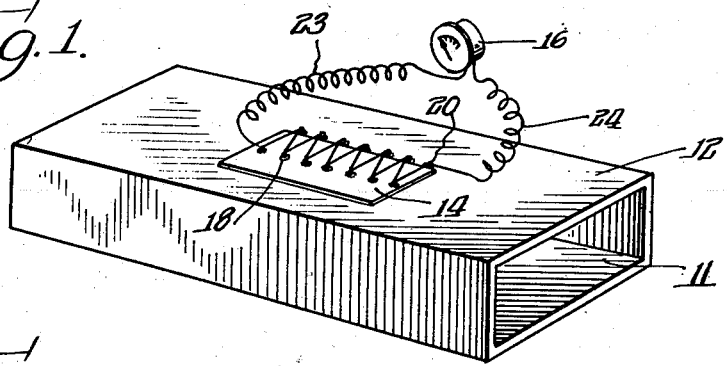
Fig. 1.
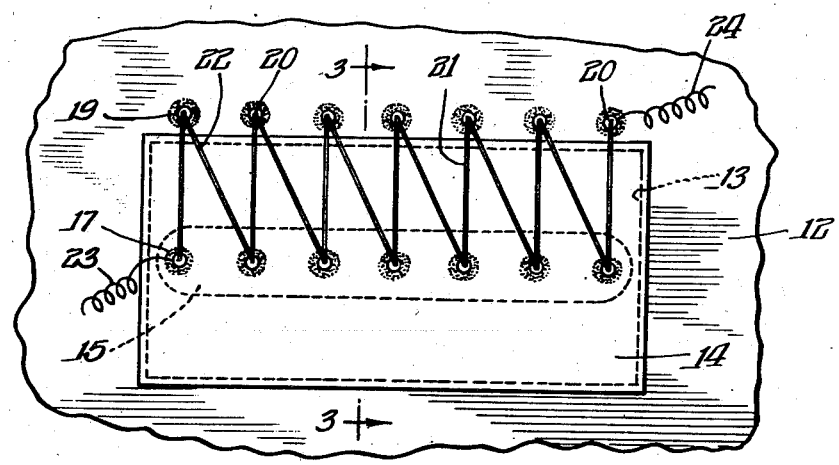
Fig. 2.
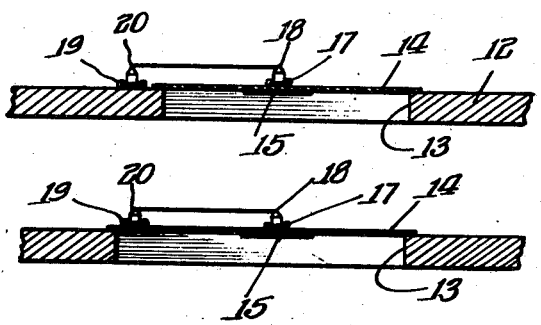
Fig. 3.
Fig. 4.
INVENTORS
William E. Bradley
Gail Daly
by their Attorneys
Howson & Howson Patented Oct. 21, 1947

2,429,200

UNITED STATES PATENT OFFICE 2,429,200

METHOD AND MEANS FOR MEASURING HIGH-FREQUENCY ENERGY

William E. Bradley, Swarthmore, Pa., and Gail Daly, Brookline, Mass., assignors, by mesne assignments, to Philco Corporation, Philadelphia, Pa., a corporation of Pennsylvania Application December 24, 1943, Serial No. 515,578

4 Claims. (Cl. 171—95)

The present invention relates to a method and apparatus for measuring radio frequency energy, and more particularly to an arrangement for measuring ultra-high radio frequency energy being transmitted through wave guides, such as hollow tubes, coaxial lines, or the like.

Heretofore the measurement of radio frequency energy generally has required the use of considerable apparatus in the form of a bridge network or apparatus utilized in a substitute type of measurement. As the frequency of the radio frequency energy is increased the measurement of such energies becomes more difficult and in many instances it is necessary to withdraw energy in amounts which have a considerable effect on the remaining energy. Accordingly it would be desirable to provide a relatively simple, reliable and rugged apparatus for measuring the power in microwave radiant energy, which would require the use of only a simple direct current meter. In accordance with the present invention these desirable objectives are obtained by forming a window in a hollow wave guide (or in the outer conductor of a coaxial line) and covering the window with a thin metallic sheet or foil. The underside of the foil has a certain portion of its area coated with some material which has relatively high radio frequency energy losses, as for example powdered iron. Radio frequency energy passing through the wave guide will encounter this material having a high loss and accordingly will bring about the generation of heat in the high loss material. The heat thus generated is a direct function of the power being transmitted by the hollow wave guide or coaxial line, and by providing a thermocouple arrangement the effect of the heat may be translated into a unidirectional current so as to give a proportional indication of the power of the radio frequency energy being transmitted through the wave guide.

It therefore is an object of the present invention to provide an improved, simple, reliable and rugged indicating apparatus for indicating the power of ultra-high frequency radiant energy being transmitted through a hollow tube or coaxial line.

It is another object of the present invention to provide an improved method and apparatus for measuring ultra-high radio frequency energy without appreciably affecting the energy being transmitted.

It is a still further object of the present invention to provide an arrangement for giving a relative indication of the radio frequency energy being transmitted by converting a portion of such energy into a direct current, and indicating the value of the current so obtained.

Other and further objects of the present invention will subsequently become apparent by reference to the following description taken in connection with the accompanying drawing, wherein;

Figure 1 is a perspective view of a wave guide provided with the apparatus constructed in accordance with the present invention;

Figure 2 is a fragmentary plan view of the said apparatus;

Figure 3 is a cross sectional view taken along line 3—3 of Fig. 2; and

Figure 4 is a similar view of a modification.

Referring to the drawing, it will be seen that there has been illustrated a wave guide 11 which may be of any desirable configuration, as for example a wave guide having a rectangular cross section. One surface of the wave guide 11, such as the top surface 12, is provided with a suitable aperture or window 13 which is arranged to be closed or covered by a thin metallic sheet or foil 14. On the underside of the thin metallic sheet 14 an elongated area 15, as indicated by the dotted lines in Figure 2 and as seen in cross section in Figure 3, is coated with a material having inherently a high radio frequency energy loss characteristic. For example, such material may comprise a mixture of powdered iron and a suitable binder which is applied to the area 15. The ultra-high frequency radio waves, upon encountering a material having such high energy loss characteristic as the powdered iron compound, will produce a heating of the powdered iron. The heat therefrom will of course, be conducted to the thin plate 14. A part of the heat thus generated is then translated into a direct current which may be measured by a simple direct current meter 16. At regular intervals along the area 15 (preferably along the center-line thereof), a plurality of metal posts are individually supported on top of the surface of the plate 14. Each of these metal posts is arranged to be in good heat conductive relation with respect to the area 15, and yet each post is insulated electrically from the metallic sheet 14. One method of so mounting these posts would be by the use of some suitable insulating cement, numerous types of which are commonly in use by radio manufacturers. The area 15 preferably has a longitudinal length sufficiently long so that the average of the temperatures of the several posts is independent of the phase of the standing wave distribution in the guide.

Accordingly, a plurality of spaced areas 17 are coated with a small amount of plastic cementing material, preferably of the thermosetting synthetic resin type, and in each area 17 a short metal post 18 is placed so that a thin insulating film of the cement remains between the bottom of the post 18 and the upper surface of the sheet 14. At some distance from the area 15, as for example, on the surface 12 of the wave guide adjacent one edge of the sheet 14, a similar series of areas 19 are coated with the cement or plastic compound and a plurality of similar posts 20, corresponding to the posts 18, are provided. The posts 18 and 20 are each formed of a material which has good heat conductivity, as for example copper wire. In order to translate the heat generated by the material in the area 15 and conducted to the thin plate 14 into direct current, each of the posts 18 which receives a portion of such heat is arranged to support a hot thermocouple, and similarly each of the posts 20 is arranged to support a cold thermocouple. Accordingly, between opposite posts 18 and 20 similar wires are stretched which may be iron or constantan. Between diagonal posts other wires are stretched, which are of a different material, as for example copper. Hence it will be seen that there are a plurality of wires 21 which may represent the one material such as constantan, and a plurality of wires 22 which represent copper wires.

A simple way of providing the thermocouples at the posts 18 and 20 is to stretch a continuous wire 21 between all of the posts and another continuous wire 22 in a different manner between all the posts and secure these wires to each post where these wires come in contact with each other. These wires may be secured in position by the application of solder and thereupon the unwanted wires are removed by clipping the wires and thus leaving a network somewhat similar to that shown in the plan view in Figure 2. The end post in the lower row is connected to a suitable conductor 23, the diagonally opposite end post in the upper row is connected to another conductor 24, and these two conductors 23 and 24 may then be connected to a suitable direct current indicating instrument 16.

The coating in the area 15, which consists of a material having a high radio frequency energy loss factor, preferably continues in an unbroken area for a distance equal to at least one half wave length in the direction of the propagation of the radio frequencies being propagated, so that the average temperature along this area will be unaffected by small amounts of reflected energy and the indicating instrument will respond primarily to the incident energy. It furthermore has been found that with suitable choice of the amount of dissipative material applied to area 15 that very little energy is extracted from the ultra-high frequency wave energy being transmitted by the wave guide. Any change in the amount of energy being transmitted through the wave guide, however, produces an appreciable change in the temperature and this temperature change therefore is reflected in the different temperature existing between the row of posts 18 and the row of posts 20. The difference in the temperatures between the cold thermocouples and the hot thermocouples determines the amount of direct current flowing through the conductors 23 and 24 and of course the amount of indication given by the direct current instrument or meter 16. Since the direct current flow is a measure of the energy being transmitted by the wave guide, the meter 16 may be calibrated in terms of energy units so as to indicate directly the transmitted energy.

It therefore becomes apparent that it is possible to utilize a relatively small amount of the energy being transmitted through a wave guide to generate heat proportional to the energy being transmitted. Since the thin plate 14 has low heat transmission capabilities laterally, most of the heat thus generated is utilized to generate a proportional direct current to give an indication of the power being transmitted. While for the purpose of illustration and explanation of the invention the area 15 has been described as being coated with a powdered iron mixture including a binder, it of course will be appreciated that other high loss materials, such as aquadag, might be utilized and that other methods of applying such high loss material can be used. Such other methods may include the spraying of fine metallic particles upon an area such as the area 15. It also will be appreciated that other means for mounting the posts 18 and 20 might be provided, although the arrangement shown has been found to be entirely satisfactory and reasonably simple and economical in manufacture.

If desired, as shown in Figure 4, the outer posts 20 may be located on the foil surface itself, near its outer edge, but the first-described embodiment is preferred.

As was indicated at the outset, the present invention is also applicable to coaxial lines, the metal foil being placed in a window in the outer conductor of the said line. Since the details of such application will be evident from the foregoing, it is deemed unnecessary to illustrate this modification of the invention.

While certain embodiments of the invention have been shown in order to illustrate the method and apparatus comprising this invention, it is to be understood of course that various modifications may be made in the arrangements and in the instrumentalities employed without departing from the spirit and scope of the invention as set forth in the appended claims. In the claims the term "wave guide" is to be understood, as it commonly is in the art, to include guides of the hollow-tube type as well as coaxial lines.

We claim:

1. In an arrangement for measuring the ultra-high radio frequency energy transmitted through a wave guide, the combination comprising a sheet of relatively thin foil-like metal having an elongated area on one side thereof coated with a material having a high radio frequency energy loss characteristic, a plurality of hot thermocouple junctions arranged in good heat conductive relation to said sheet in a row on the side of said sheet opposite said coated area, a plurality of cold thermocouple junctions arranged in good heat conductive relation to said sheet in a row adjacent the edge of said sheet, said coated area being adapted to be arranged on the inside of a wave guide and extending in the direction of transmission of ultra-high frequency energy therethrough, and a meter connected in circuit with said thermocouple junctions.

2. In an arrangement for measuring the ultra-high radio frequency energy transmitted through a wave guide, the combination comprising a sheet of relatively thin foil-like metal having an elongated area on one side thereof coated with a material having a high radio frequency energy loss characteristic, a plurality of hot thermocouple junctions arranged in good heat conductive relation to said sheet in a row on the side of said sheet opposite said coated area, a plurality of cold thermocouple junctions arranged in good heat conductive relation to said sheet in a row adjacent the edge of said sheet, said coated area being adapted to be arranged on the inside of a wave guide and extending in the direction of transmission of ultra-high frequency energy for a distance equal to at least one half wave length of said energy, and a meter connected in circuit with said thermocouple junctions.

3. An ultra-high radio frequency energy power indicator comprising a wave guide having therein a longitudinally extending window of length at least one half wave length of the energy being transmitted, a relatively thin metal sheet covering said window, a longitudinally extending area on the inside of said sheet being covered with a finely divided metal coating having a high radio frequency energy loss characteristic, said coating having a length at least equal to one half wave length of the energy being transmitted and extending in a direction of the propagation of said energy, a row of metal supporting posts mounted on the exterior of said metal sheet above said coated area and insulated from said sheet, a second row of metal supporting posts mounted adjacent one edge of said metal sheet and insulated therefrom, a plurality of wires interconnecting certain pairs of posts of said rows, a plurality of wires of a different kind of metal interconnecting other pairs of posts of said rows so as to form a series of thermocouples, and an electric indicating meter connected to diagonally opposite end posts of the respective rows.

4. In a microwave energy indicating apparatus, the combination comprising a hollow wave guide having a longitudinally extending opening therein, a relatively thin metal covering for said opening, a longitudinally extending area on the inside of said wave guide on said metal sheet having a coating of material having a radio frequency energy loss characteristic sufficient to generate appreciable heat, said coated area extending in the direction of propagation of the energy for a distance equal to at least one half wave length of the energy being propagated, a plurality of hot thermocouple junctions arranged in good heat conductive relation with said material but electrically insulated therefrom and from said metal covering, a plurality of cooperating cold thermocouple junctions arranged at a distance from said first thermocouple junctions, and an electric circuit including an indicating meter connected in series with said thermocouples.

WILLIAM E. BRADLEY.
GAIL DALY.

REFERENCES CITED

The following references are of record in the file of this patent:

UNITED STATES PATENTS

| Number | Name | Date |
| --- | --- | --- |
| 404,860 | Pfannkuche | June 11, 1889 |
| 1,407,147 | Goodwin, Jr. | Feb. 21, 1922 |
| 1,456,591 | Goodwin, Jr. | May 29, 1923 |
| 2,130,960 | Lamb | Sept. 20, 1938 |
| 2,284,379 | Dow | May 26, 1942 |
| 2,151,157 | Schelkunoff | Mar. 21, 1939 |
| 2,197,123 | King | Apr. 16, 1940 |
| 2,344,641 | Rosencrans | Mar. 21, 1944 |
| 2,106,768 | Southworth | Feb. 1, 1938 |
| 2,387,158 | Kozanowski | Oct. 16, 1945 |
| 2,398,606 | Wang | Apr. 16, 1946 |